(12) United States Patent
Sambhwani

(10) Patent No.: US 8,737,451 B2
(45) Date of Patent: May 27, 2014

(54) MMSE MUD IN 1X MOBILES

(75) Inventor: Sharad Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 657 days.

(21) Appl. No.: 11/684,308

(22) Filed: Mar. 9, 2007

(65) Prior Publication Data

US 2008/0219325 A1 Sep. 11, 2008

(51) Int. Cl.
*H04B 1/00* (2006.01)

(52) U.S. Cl.
USPC .......................................................... 375/148

(58) Field of Classification Search
USPC ......... 375/144, 147, 148, 259, 267, 340, 346, 375/348, 150; 370/316, 321, 335, 342
See application file for complete search history.

(56) References Cited

U.S. PATENT DOCUMENTS

| | | | |
|---|---|---|---|
| 6,363,103 B1 | 3/2002 | Buehrer et al. | |
| 7,324,584 B1 * | 1/2008 | Vigneron et al. | 375/150 |
| 2002/0163896 A1 * | 11/2002 | Hiramatsu | 370/335 |
| 2002/0181562 A1 * | 12/2002 | Castelain | 375/148 |
| 2003/0021337 A1 * | 1/2003 | Moshavi et al. | 375/148 |
| 2004/0052305 A1 * | 3/2004 | Olson et al. | 375/148 |
| 2004/0229567 A1 * | 11/2004 | Bilgic et al. | 455/63.1 |
| 2005/0002445 A1 * | 1/2005 | Dunyak et al. | 375/148 |
| 2005/0031060 A1 * | 2/2005 | Thomas et al. | 375/148 |
| 2005/0111405 A1 * | 5/2005 | Kanterakis | 370/328 |
| 2005/0128985 A1 * | 6/2005 | Liberti et al. | 370/335 |
| 2005/0163196 A1 * | 7/2005 | Currivan et al. | 375/144 |
| 2006/0115026 A1 * | 6/2006 | MacLeod | 375/343 |
| 2006/0153283 A1 * | 7/2006 | Scharf et al. | 375/148 |
| 2006/0229051 A1 * | 10/2006 | Narayan et al. | 455/296 |
| 2007/0025299 A1 * | 2/2007 | Scharf et al. | 370/335 |

FOREIGN PATENT DOCUMENTS

| | | |
|---|---|---|
| DE | 10138963 | 3/2003 |
| EP | 0876001 | 11/1998 |
| JP | 2003531513 A | 10/2003 |
| WO | 0232003 | 4/2002 |
| WO | 0233840 | 4/2002 |
| WO | 02093768 | 11/2002 |
| WO | WO02093766 A1 | 11/2002 |
| WO | 2006004948 | 1/2006 |
| WO | 2006044718 | 1/2006 |
| WO | WO2007024963 | 3/2007 |

OTHER PUBLICATIONS

International, Search Report, PCT/US08/056102, International Search Authority, European Patent Office, Oct. 27, 2008.

(Continued)

*Primary Examiner* — Sam K Ahn
*Assistant Examiner* — Syed Haider
(74) *Attorney, Agent, or Firm* — Thien T. Nguyen

(57) ABSTRACT

Systems and methodologies are described that facilitate equalizing inter-sector interference and performing interference cancellation on a forward link by utilizing a combination of pilot interference cancellation followed by selective interference cancellation. Selective interference cancellation can be performed using, for instance, a reduced-rank minimum mean-squared error multi-user detection receiver. A system matrix can be reduced by the combined cancellation protocols, and can be further reduced by performing a fast Hadamard transform there on, which in turn can minimize matrix complexity, as well as computational overhead associated with processing the system matrix.

34 Claims, 10 Drawing Sheets

(56) References Cited

OTHER PUBLICATIONS

Written Opinion, PCT/US08/056102, International Search Authority, European Patent Office, Oct. 27, 2008.
Cagley et al., "Pilot Signal Cancellation for an IS-95 Downlink SIC Receiver," Conference Record of the 35th Asilomar Conference on Signals, Systems, & Computers, Nov. 4-7, 2001, pp. 1714-1717, vol. 2, Asilomar Conference on Signals, Systems, & Computers, New York, NY, USA, XP010582326.
Huang et al., "Combined Pilot Multipath Noise Cancellation and Partial Decorrelation for Coherent Multicode CDMA Receivers," Global Telecommunications Conference, Globecom '97, IEEE, Phoenix, AZ, Nov. 3-8, 1997, pp. 904-909, vol. 2, IEEE, New York, NY, USA, XP010254685.

* cited by examiner

MMSE MUD IN 1X MOBILES

BACKGROUND

I. Field

The following description relates generally to wireless communications, and more particularly to reducing computational overhead and inter-sector interference using a combination of interference cancellation techniques.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one, or all the data streams carried by the composite stream. Likewise, a mobile terminal can transmit data to the base station or another mobile terminal. Such communication between base station and mobile terminal or between mobile terminals can be degraded due to channel variations and/or interference power variations. For example, the aforementioned variations can affect base station scheduling, power control, and/or rate prediction for one or more mobile terminals.

Conventional systems and/or methods are computationally expensive and require higher-than-necessary processing resource commitments when decoding forward link transmissions in the presence of inter-sector interference. Thus, there is an unmet need in the art for systems and/or methodologies of improving throughput in such wireless network systems and/or reducing processing overhead.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with performing inter-sector interference equalization and interference cancellation on a forward link in a wireless communication environment. Pilot interference cancellation can be performed based on known pilot sequences, and selective interference cancellation can be performed subsequently to cancel code sequences of interfering user devices to reduce a 128×128 system matrix. The matrix can be further reduced by performing a fast Hadamard transform thereon, which can facilitate reducing processing overhead associated with decode code sequences for the user device while mitigating interference thereat.

According to another aspect, a method of mitigating inter-sector interference on a forward link in a wireless communication environment can comprise performing a pilot interference cancellation technique on pilot sequences in a received signal, and performing a selective interference cancellation technique after pilot interference cancellation. The method can further comprise estimating a channel for each sector from which a signal is received, convolving a 128-chip sequence code with the channel estimate for each sector, adding the convolved values for the sectors, and subtracting the sum from the received signal. Additionally, the method can comprise evaluating and ranking Walsh bins for the sectors, convolving code sequences for a user device with respective channel estimates for the sectors, convolving other code sequences received in the signal with channel estimates for respective sectors, and evaluating a minimum mean-squared error output estimate for the received signal.

According to another aspect, an apparatus that facilitates reducing inter-sector interference in a wireless communication environment comprises a memory that stores information related to pilot sequences utilized by sectors transmitting to a user device, a processor that analyzes information stored in the memory and reduces a system matrix for processing a user device code sequence, and a MUD receiver, coupled to the processor, that receives a signal from at least one sector transmitter. The apparatus can additionally comprise a channel estimation component that estimates a channel for each of a plurality of sectors from which the user device receives a signal and a pilot interference cancellation component that evaluates pilot sequences stored in the memory and subtracts energies associated therewith from the receive signal energy to cancel pilot sequences from the system matrix. Furthermore, the apparatus can comprise a selective interference cancellation component that is operatively associated with the MUD receiver and which cancels signal energies associated with N interfering user devices, where N is an integer. The MUD receiver can generate a pseudo-reduced matrix based at least in part on the received signal minus the pilot sequences and N interfering user device sequences, and the processor can perform a fast Hadamard transform on the pseudo-reduced matrix to generate a reduced system matrix, which reduces computational overhead associated with signal decoding and the like.

According to yet another aspect, an apparatus that facilitates mitigating interference in a wireless communication environment can comprise means for performing a pilot interference cancellation protocol on a signal received at a user device, and means for employing a selective interference cancellation protocol on the signal received the user device. The apparatus can additionally comprise means for generating a system matrix based on code sequences in the received signal, means for reducing the system matrix by subtracting out energies associated with cancelled pilot sequences and selectively cancelled code sequences, and means for performing a fast Hadamard transform to further reduce the system matrix.

Still another aspect relates to a computer-readable medium having stored thereon computer-executable instructions for performing a pilot interference cancellation protocol based at least in part on known pilot sequences associated with sectors from which a user device receives a signal and performing a selective interference cancellation technique to cancel out code sequences from the received signal. The computer-readable medium can further comprise instructions for generating a system matrix based at least in part on the received signal after pilot interference cancellation and selective interference cancellation, for performing a fast Hadamard transform on the system matrix to generate a reduced system matrix, and for processing the reduced system matrix to evaluate a portion of the received signal intended for the user device.

Yet another aspect relates to a processor that executes instructions for performing a pilot interference cancellation protocol using known pilot sequences for sectors from which a user device receives a signal and for performing a selective interference cancellation technique to cancel selected interfering code sequences from the received signal. The processor can additionally execute instructions for generating a system matrix based at least in part on the received signal after pilot interference cancellation and selective interference cancellation and for performing a fast Hadamard transform on the system matrix to generate a reduced system matrix. The processor can then process the reduced system matrix to evaluate code sequences in the received signal intended for the user device.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
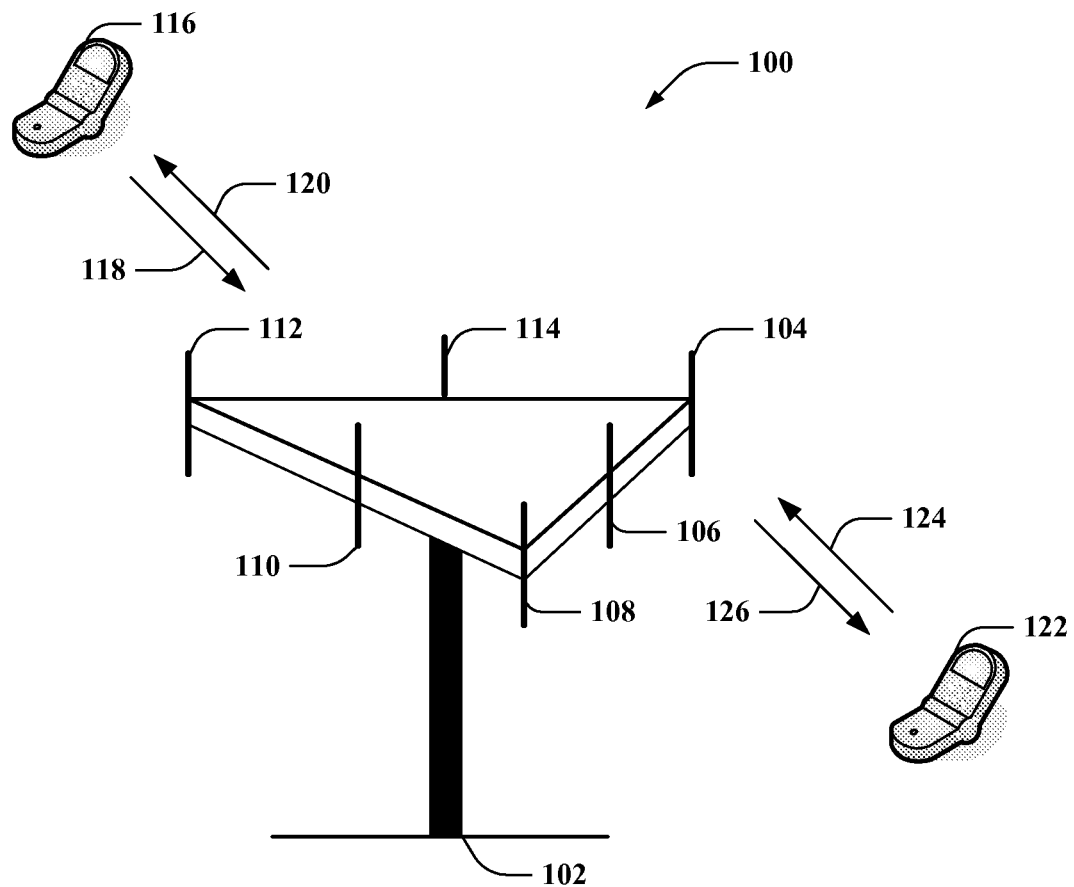
FIG. 1 is an illustration of a multiple access wireless communication system, according to one or more embodiments.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

FIG. 1 is an illustration of a multiple access wireless communication system 100 according to one or more embodiments. A 1-sector base station 102 includes multiple antenna groups, one including antennas 104 and 106, another including antennas 108 and 110, and a third including antennas 112 and 114. According to the figure, only two antennas are shown for each antenna group, however, more or fewer antennas may be utilized for each antenna group. Mobile device 116 is in communication with antennas 112 and 114, where antennas 112 and 114 transmit information to mobile device 116 over forward link 120 and receive information from mobile device 116 over reverse link 118. Mobile device 122 is in communication with antennas 104 and 106, where antennas 104 and 106 transmit information to mobile device 122 over forward link 126 and receive information from mobile device 122 over reverse link 124.

Each group of antennas and/or the area in which they are designated to communicate is often referred to as a sector of base station 102. In the illustrated embodiment, antenna groups each are designed to communicate to mobile devices in a sector of the areas covered by base station 102. In communication over forward links 120 and 126, the transmitting antennas of base station 102 can utilize beam-forming techniques in order to improve the signal-to-noise ratio of forward links for the different mobile devices 116 and 122. Additionally, a base station using beam-forming to transmit to mobile devices scattered randomly through its coverage area causes less interference to mobile devices in neighboring cells/sectors than a base station transmitting through a single antenna to all mobile devices in its coverage area. A base station may be a fixed station used for communicating with the terminals and may also be referred to as an access point, a Node B, or some other terminology. A mobile device may also be called a mobile station, user equipment (UE), a wireless communication device, terminal, access terminal, user device, or some other terminology. A user device or the like, as described herein can be, for example, a cellular phone, a smartphone, a laptop, a PDA, a handheld communication device, a handheld computing device, a satellite radio, a global positioning system, or any other suitable device for communicating over a wireless network, as will be appreciated by one skilled in the art.

In accordance with various aspects presented herein, voice capacity on a downlink transmission in a CDMA communication environment (e.g., cdma2000, . . . ) can be improved using the systems and methods presented herein. For instance a downlink transmission from base station 102 can have its voice data capacity enhanced by implementing multi-user detection (MUD) protocol in conjunction with a pilot interference cancellation (PIC) scheme. A MUD receiver, such as a reduced-rank minimum mean-squared error (MMSE) MUD receiver can be utilized with the PIC protocol to mitigate inter-symbol interference and address forward link interference cancellation, as will be described in greater detail below.

Figure 2:
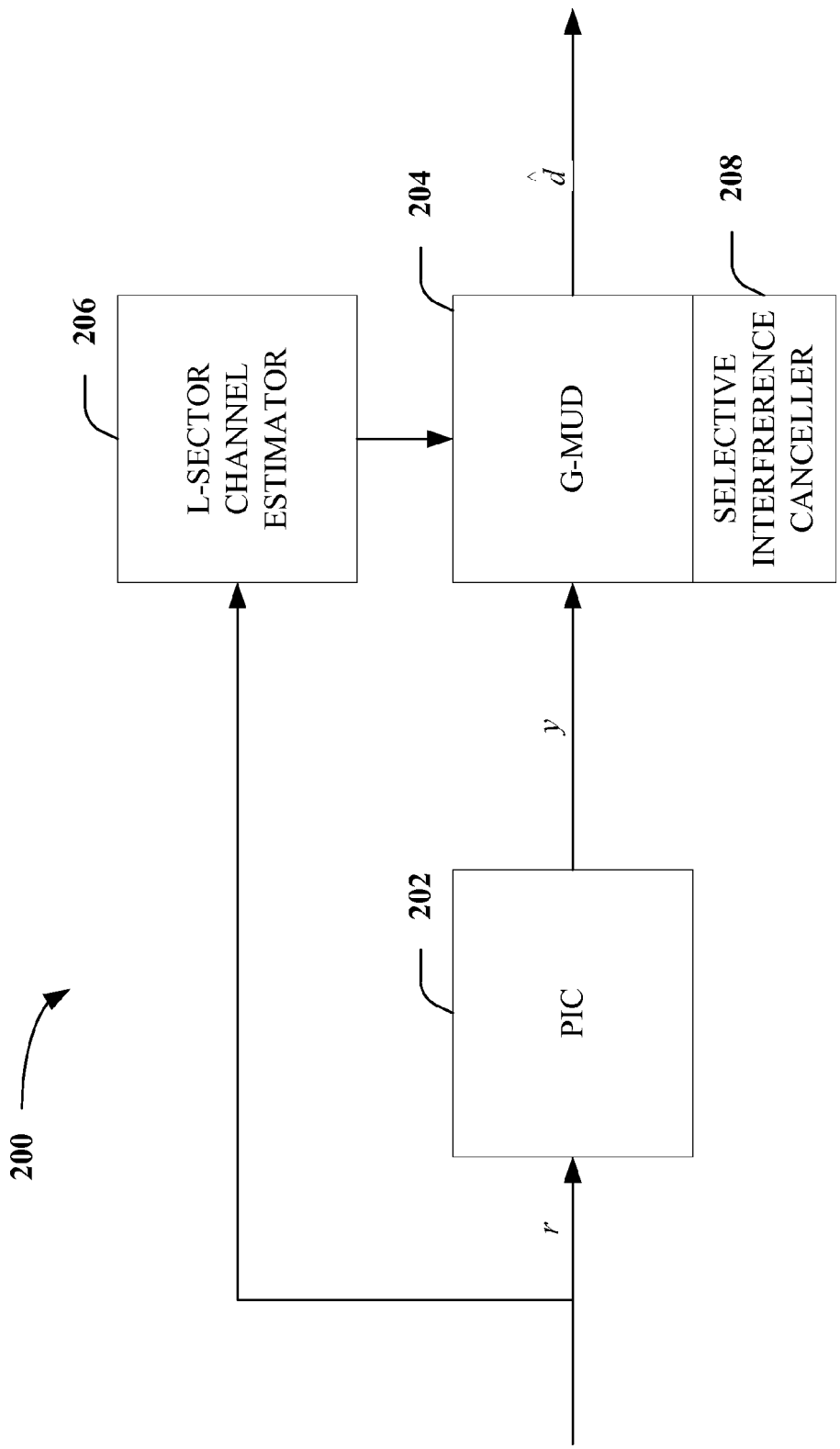
FIG. 2 is an illustration of a high-level block diagram of a system that facilitates interference cancellation on the forward link in CDMA systems, in accordance with various aspects.

FIG. 2 is an illustration of a high-level block diagram of a system 200 that facilitates interference cancellation on the forward link in CDMA systems, in accordance with various aspects. System 200 can comprise a front-end pilot interference canceller (PIC) 202 that can subtract out energy associated with known pilot sequences to reduce a number of Walsh bins that require processing. For instance, because pilot sequences transmitted from a base station are known, energy on such channels in a received signal, r, can be estimated by PIC 202, which can then reconstruct such sequences and cancel them out to perform pilot interference cancellation and produce an output signal, y. Signal y can be received by a generic MUD (GMUD) 204 that further cancels a number N of the strongest Walsh bins among all sectors of interest. A channel estimator 206 can be operatively coupled to GMUD 204 and can additionally receive signal r and perform a channel estimation technique thereon to estimate channels for GMUD 204. GMUD 204 can then select the N strongest Walsh bins, which selection can be at least in part based on implementation constraints due to a related matrix inversion, and can cancel selected Walsh bins to reduce interference at, for example, a user device in which the system structure 200 is employed.

Samples of the received signal r can be collected in the space and chip domain, and the received signal r can be expressed in terns of known transmitted pilot symbols, p, from all sectors on the pilot channel (e.g., Walsh channel 0) via a system matrix $T_p$, unknown transmitted symbols, d, from all sectors for active users on a traffic channel via a system matrix $T_d$, and an additive white Gaussian noise source, n, such that:

$$r = T_p p + T_d d + n \quad (1)$$

Since pilot symbols, p, are known and $T_p$ can be estimated, $T_p p$ can be subtracted from r to obtain y, such that:

$$y = r - T_p p = T_d d + n \quad (2)$$

In order to overcome complexity issues that can arise from accounting for all symbols transmitted from all sectors in the vector, d, a number of columns in the matrix $T_d$ can be restricted to N. For example, when attempting to account for all such symbols, the linear system can become undeterminable (e.g., an insufficient number of equations can be present to permit solving for all unknowns). Additionally and/or alternatively, problems can arise even when the number of equations equals the number of unknowns (e.g., where r is observed over a window of 128 chips, such that a solution can involve inverting a 128×128 matrix). Although processing resources allocated to performing such complex tasks, limiting the number of columns in matrix $T_d$ to N can reduce processing overhead associated with such computations.

Among the N columns, a subset of columns, $N_d$, can be attributed to a desired data associated with a particular user device. The remaining columns, $N-N_d$, can be utilized to represent the strongest Walsh bins across all sectors as seen by the user device. Thus, if desired, only the most dominant user devices need be cancelled by GMUD 204, which can be associated with a selective interference cancellation component 208 that facilitates such cancellation. A final output signal, $\hat{d}$, can be generated y GMUD 204 via, for instance, a least squares solution, such that:

$$\hat{d}_{LS} = (T^H T)^{-1} T^H y \quad (3)$$

Alternatively, a minimum means-squared error technique can be performed by GMUD 204, such that:

$$\hat{d}_{MMSE} = (T^H T + \sigma^2 I)^{-1} T^H \quad (4)$$

where T is the matrix that contains only N columns, and $\sigma^2$ represents the variance of unaccounted-for interference and thermal noise as a result of reducing $T_d$ to T.

With regard to pilot interference cancellation performed by the PIC 202, channel estimation can be performed to estimate a complex channel impulse response $h_k^{(j)}$ of each sector j based at least in part on a correlation with a pilot channel for each sector. As illustrated with regard to Equation (2), such can involve subtracting a contribution from all pilot channels of all sectors from a total received signal. Each column j of the matrix $T_p$ represents a spreading code $c_k^{(j)}$ convolved with the channel impulse response $h_k^{(j)}$. Thus, the horizontal component of $T_p$ can exhibit some growth due to channel impulse response duration. For instance, in order to process data corresponding to 128 transmitted chips, and a delay profile for each channel response extends to a maximum of 20 chips, than the row dimension for $T_p$ can have a maximum of 148 chips, and column dimension can be equal to j, where j represents a total number of sectors under consideration. Since all pilot symbols from different sectors can have the same value, the columns of $T_p$ can be summed (e.g., which corresponds to the operation $T_p p$) and can be subtracted from r to obtain the output signal y from the PIC 202, such that:

$$y = r - T_p p.$$

Figure 3:
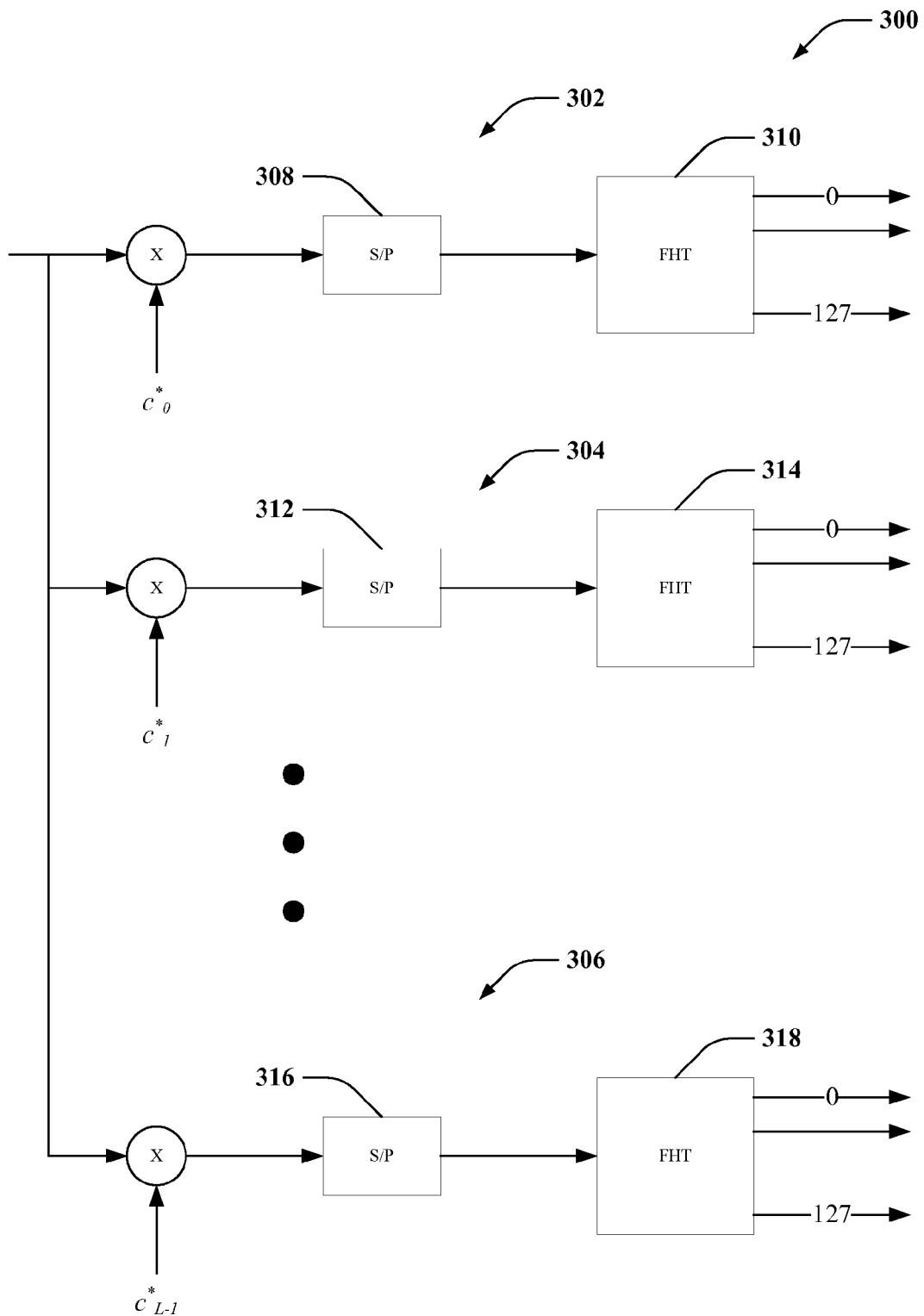
FIG. 3 illustrates a system that facilitates selective interference cancellation in conjunction with a GMUD, in accordance with one or more aspects set forth herein.

FIG. 3 illustrates a system 300 that facilitates selective interference cancellation in conjunction with a GMUD, in accordance with one or more aspects set forth herein. For example, a GMUD system similar to that described above with regard to FIG. 2 can be employed to decode a desired user device's data (e.g., a user device in which the system is employed) to account for matrix columns attributable to that user device. It will be appreciated that a number of columns $N_d$ associated with a user device can remain constant regardless of whether the user is in a soft-handoff situation with a number of different sectors, because data transmitted from the different sectors is the same. Thus, columns associated with information from all soft-handoff sectors can be added and replaced with a singled column that represents the sum of all such columns, as illustrated by the following simplified example:

$$\begin{bmatrix} a_1 b_2 \\ a_2 b_2 \end{bmatrix} \begin{bmatrix} d \\ d \end{bmatrix} = \begin{bmatrix} a_1 + b_1 \\ a_2 + b_2 \end{bmatrix} [d] \quad (5)$$

Over a time window of 128 chips (e.g., approximately 33.35 microseconds in a typical radio frame of a 10 ms duration), a number of symbols transmitted to the desired user device is equal to $128/SF_{desired\_user}$ where $SF_{desired\_user}$ is the spreading factor for the desired user device. This number is also equal to the number of columns attributable to the desired user device in matrix T. For instance, if the desired user device has a spreading factor of 4, then there are 32 columns in the matrix T that are attributable to the desired user device (e.g., 128/4=32). The columns can be generated by convolving each code sequence (e.g., Walsh code $w_k$ multiplied by $c_k^{(0)}$) of length $SF_{desired\_user}$ by $h_k^{(j)}$, and then scaling each column by a traffic-to-pilot (T2P) estimate for the desired user device's symbols. The T2P estimate is a ratio of an energy level associated with data portions of a signal designated for the desired user device to an energy level for a pilot assigned thereto.

The remaining $N-N_d$ columns of matrix T can be generated to facilitate creation of a complete system matrix. Since spreading codes for other traffic channel are not known to the desired user device, energy in Walsh bins associated with each sector can be evaluated, as illustrated in FIG. 3. Such estimation can involve despreading a received signal with each sector's spreading code $c_k^{(j)}$ and subsequently applying a fast Hadamard transform (FHT) to the signal. For instance, a first sector's 302 spreading code can be employed to facilitate despreading by a despreading component 308, which can be followed by signal transformation by an FHT component 310. Similarly, despreading and FHT procedures can be performed for a second sector 304 through an $L^{th}$ sector, via despreading components 312 and 316 and FHT components 314 and 318, respectively, where L is an integer that represents a total number of sectors from which a particular user device receives a signal.

Energies associated with each despreaded and transformed signal can be sorted, and the $N-N_d$ strongest energies (e.g., representing the strongest sector/traffic Walsh channels) can be selected for cancellation. The selected $N-N_d$ codes (e.g., 128 chips in length) can be convolved with their corresponding channel impulse responses and then scaled by their respective T2P estimations to serve as columns of matrix T. Additionally, inter-sector interference related to pilot and data symbols from a previous 128-chip block can be accounted for with regard to a subsequent 128-chip block of a signal, and such contribution can be added to an initial portion (e.g., of a length equal to a delay profile) of the columns of $T_p$ and T, respectively.

Figure 4:
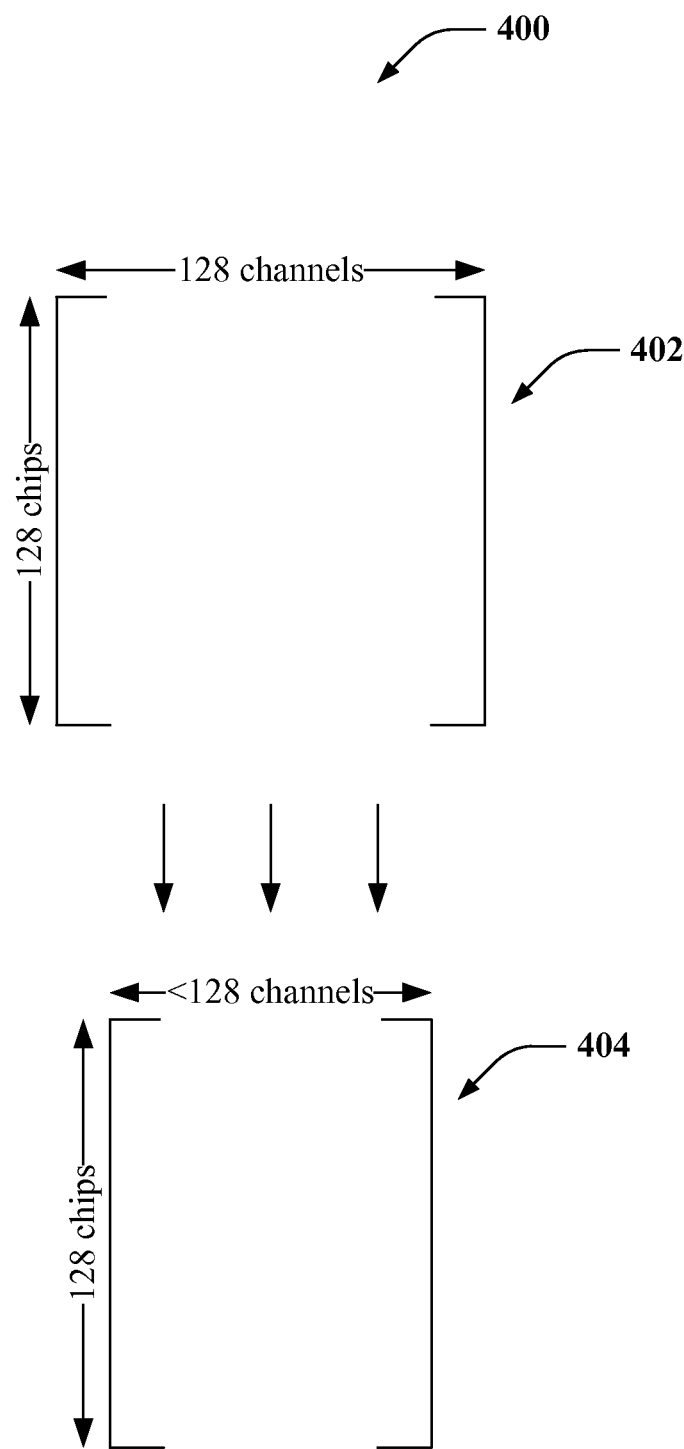
FIG. 4 is an illustration of a system that facilitates matrix reduction to reduce computational overhead associated with processing large matrices, in accordance with various aspects.

FIG. 4 is an illustration of a system 400 that facilitates matrix reduction to reduce computational overhead associated with processing large matrices, in accordance with various aspects. A first matrix 402 is illustrated as a 128×128 matrix depicting 128 channels in a horizontal dimension and 128 chips in a vertical dimension. As described above, simplifying the system matrix 402 to improve voice capacity on a downlink in a CDMA system can reduce processing overhead. When a user device is receiving a signal from a base station, it can be interfered by neighboring cells. Such can be alleviated by employing the pilot interference cancellation techniques described herein in conjunction with a MUD receiver, because pilot sequences are known to the user device. Then based on signal strength estimation of remaining channels, a subset of the strongest channels can be selected (e.g., channels most likely causing interference at the user device). For instance, if 8 channels are substantially stronger that other channels, then the 128×128 system matrix 402 can be reduced to an 8×128 matrix. After performing a Hadamard transform thereon, such a matrix will be further reduced to an 8×8 matrix, which is far less computationally expensive to process than a 128×128 matrix. In this manner, processing overhead can be reduced by a combination of pilot interference cancellation followed by selective interference cancellation.

Figure 5:
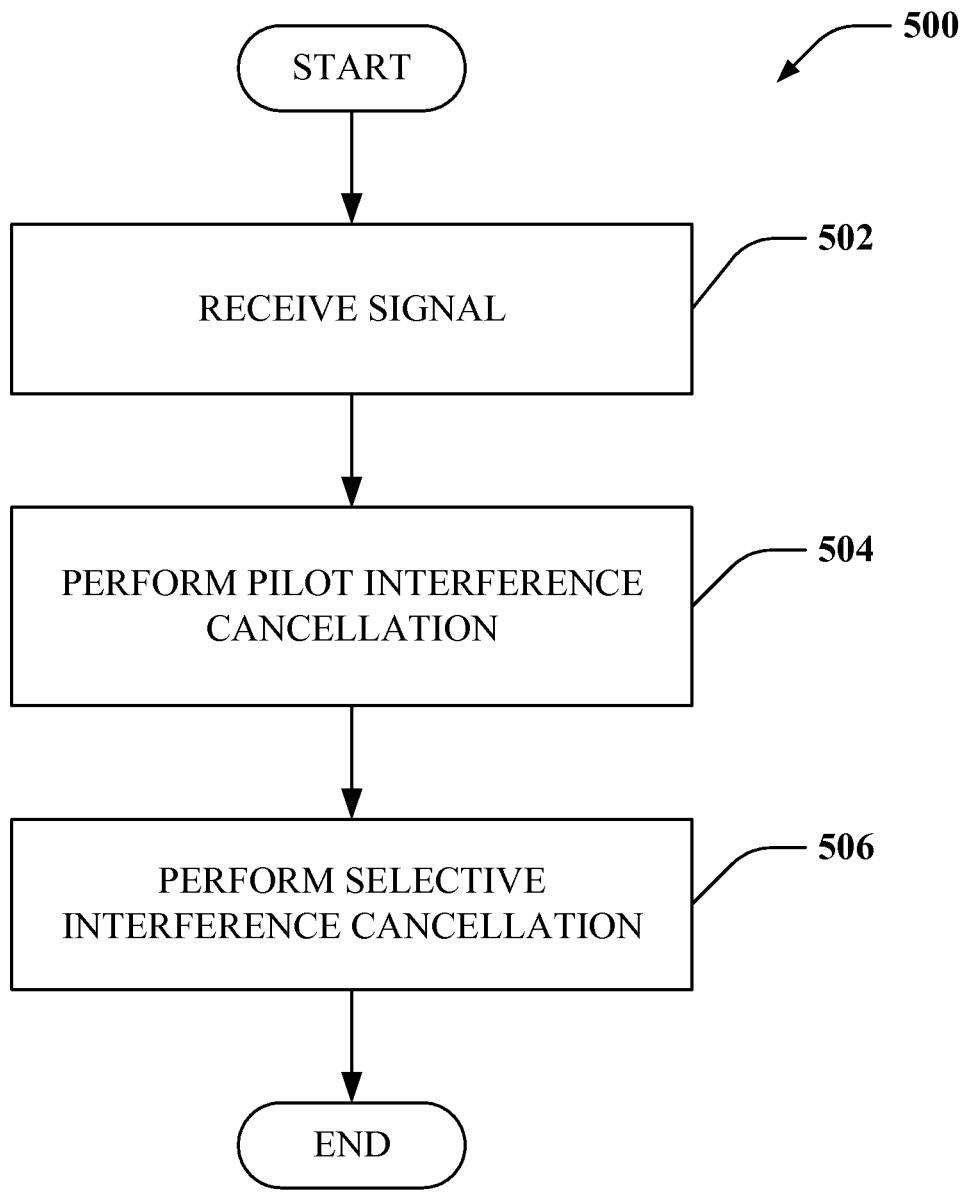
FIG. 5 is an illustration of a methodology for performing pilot interference cancellation as well as selective interference cancellation utilizing a generic MUD receiver in a TD-CDMA wireless communication environment, in accordance with various aspects.
Figure 6:
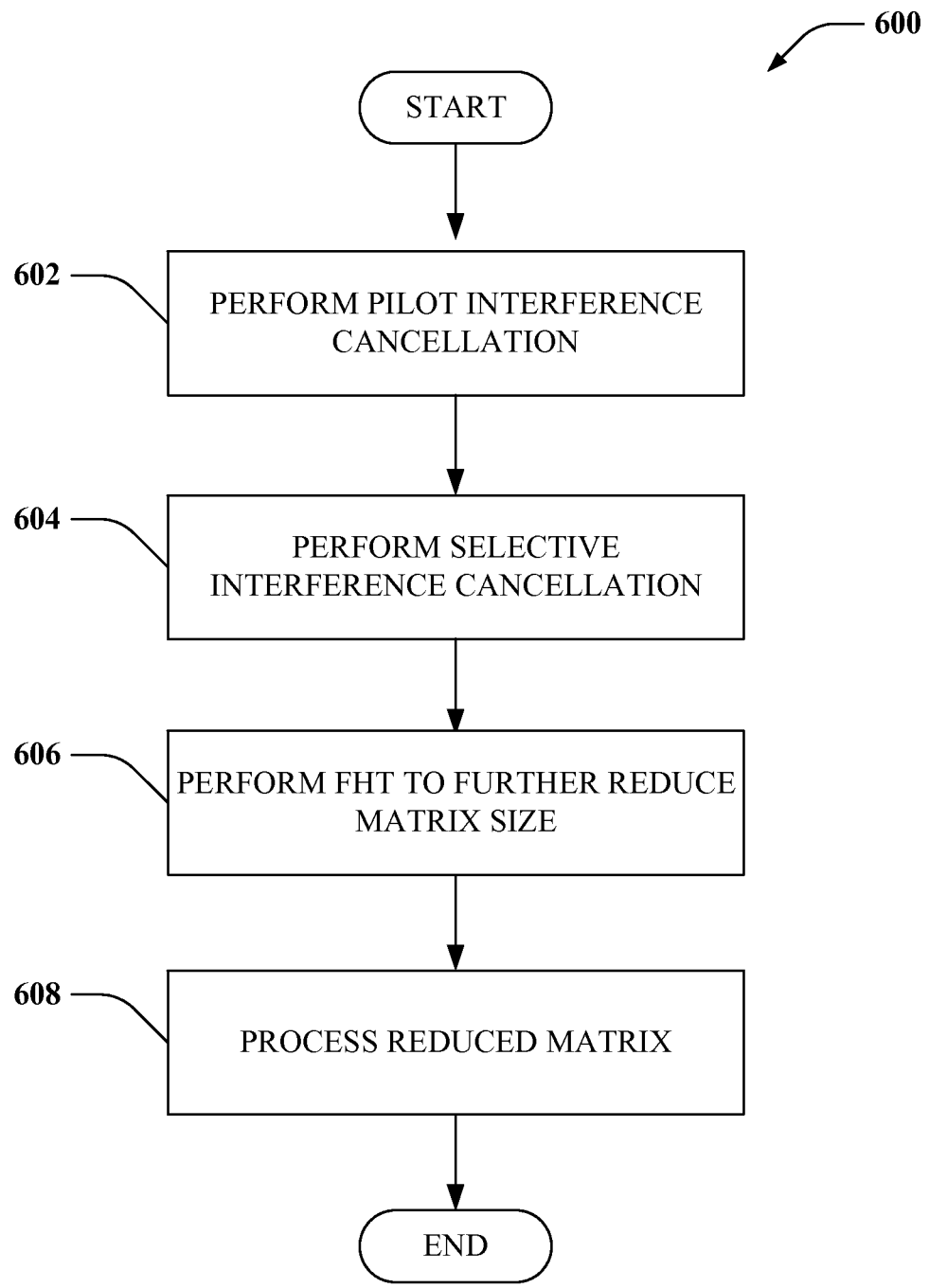
FIG. 6 illustrates a methodology for forward link interference cancellation in a TD-CDMA wireless communication environment, in accordance with one or more aspects set forth herein.
Figure 7:
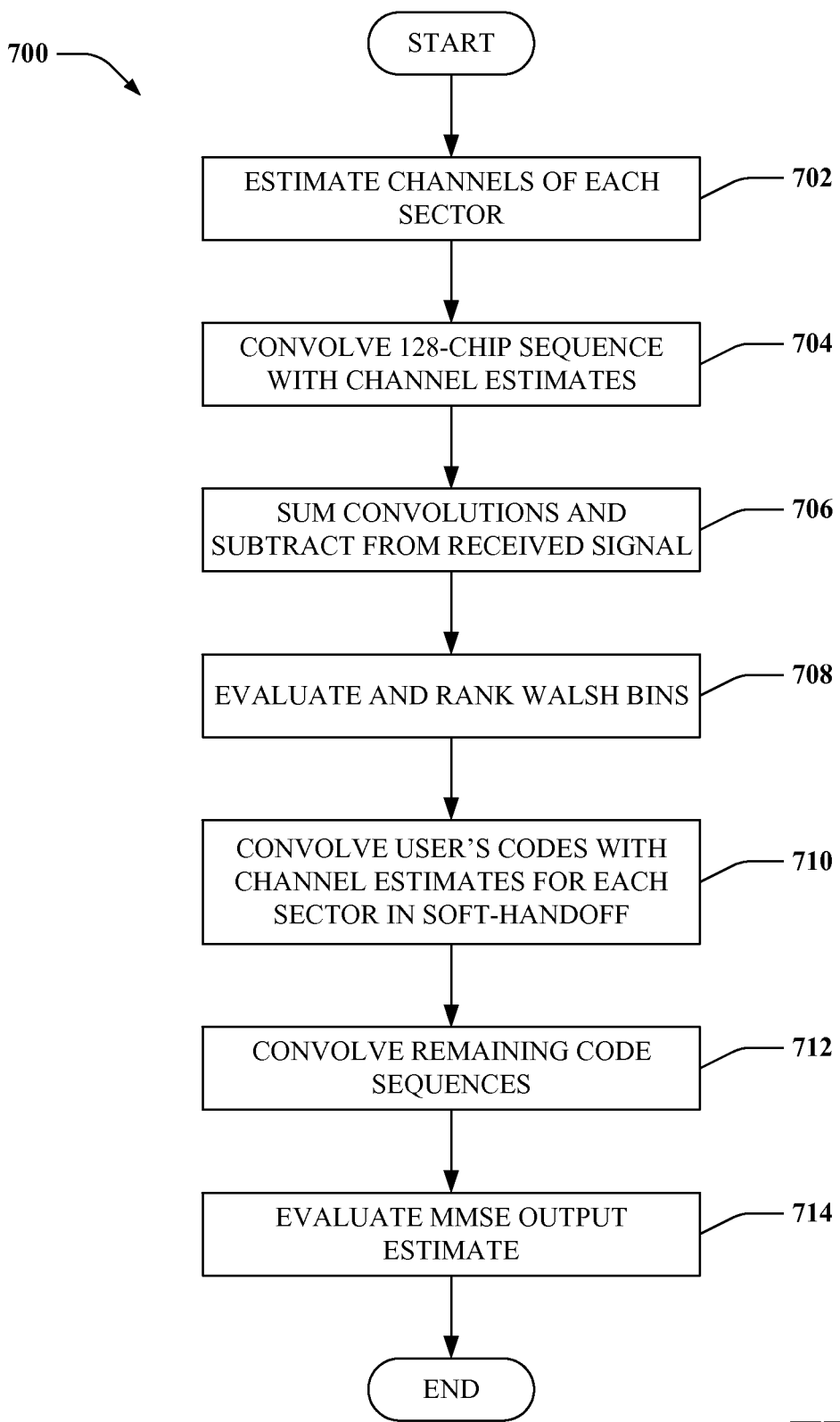
FIG. 7 is an illustration of a methodology for reducing a system matrix for processing a signal received at a user device via a combination of interference cancellation techniques, in accordance with various aspects.

Referring to FIGS. 5-7, methodologies relating to performing forward link interference cancellation and resolving intersector interference equalization. For example, methodologies can relate to employing pilot interference cancellation in conjunction with a MUD receiver in a UMTS TDD wireless environment, an OFDM environment, an OFDMA environment, a CDMA environment, a TDMA environment, a TDD environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

FIG. 5 is an illustration of a methodology 500 for performing pilot interference cancellation as well as selective interference cancellation utilizing a generic MUD receiver in a TD-CDMA wireless communication environment, in accordance with various aspects. At 502, a signal can be received at, for instance, a user device such as a cellular phone, a smartphone, a PDA, a laptop, a PC with wireless capability, a handheld communication device, a handheld computing device, or any other suitable user device. At 504, pilot sequences in the received signal can be evaluated and cancelled to facilitate reducing the size of a system matrix that can be processed to assess transmitted data intended for the user device. For example, pilot sequences associated with one or more sectors transmitting to the user device can be known to the user device, which can evaluate such pilot sequences and can reconstruct them. Energies associated with reconstructed sequences can then be subtracted out from the received signal in order to perform pilot interference cancellation at 504.

At 506, selective interference cancellation can be performed in order to further reduce a system matrix prior to processing the matrix, which in turn facilitates reducing computational overhead associated with processing the matrix. For instance, an initial matrix can be 128 channels by 128 chips in size. According to an example, it can be determined through a series of acts (e.g., such as are described with regard to FIGS. 2 and 3) that 6 channels in the received signal are causing interference at a level substantially greater than other received channels. In such a case, the system matrix for a given block can be reduced to 6 channels by 128 chips, which is substantially less expensive to process than a 128×128 matrix. Thus, through a combination of pilot interference cancellation followed by selective interference cancellation, processing requirements at a user device can be greatly reduced.

FIG. 6 illustrates a methodology 600 for forward link interference cancellation in a TD-CDMA wireless communication environment, in accordance with one or more aspects set forth herein. At 602, a signal can be received at a user device and pilot sequences in the received signal can be evaluated and cancelled to facilitate reducing the size of a system matrix. For example, pilot sequences associated with sectors transmitting to the user device can be known to the user device, which can evaluate and reconstruct such pilot sequences. Energies associated with reconstructed sequences can then be subtracted out from the received signal in order to perform pilot interference cancellation at 602. At 604, selective interference cancellation can be performed in order to further reduce a system matrix prior to processing the matrix, which in turn facilitates reducing computational overhead associated with processing the matrix. For instance, an initial matrix can be 128×128 in size, and a determination can be made that some number of channels, Y, in the received signal are causing interference at a level substantially greater than other received channels. In such a case, the system matrix for a given block can be reduced to Y channels by 128 chips, which is substantially less expensive to process than a 128×128 matrix.

At 606, a fast Hadamard transform (FHT) can be performed on the Yx128 matrix to further reduce the matrix size to YxY. At 608, the reduced YxY matrix can be processed to facilitate decoding signal information intended for the user device in with the method 600 is employed. The YxY matrix, being smaller in size than the original 128×128 matrix, is much cheaper to process than the original matrix, which can facilitate improving processing speed and reducing processing overhead on the forward link. Thus, on original 128-channel by 128-chip system matrix can be reduced by canceling pilot contributions to the received signal, canceling selected interferers contributing to the received signal, and performing an FHT on the semi-reduced matrix to generate a reduced matrix for processing to decode received data intended for a user device at which the signal is received.

FIG. 7 is an illustration of a methodology 700 for reducing a system matrix for processing a signal received at a user device via a combination of interference cancellation techniques, in accordance with various aspects. At 702, channels associated with each sector from which a user device is receiving a signal can be estimated. Channel estimation can be performed utilizing a searcher, a finger, etc., as will be appreciated by those skilled in the art. At 704, L 128-chip sequence codes can be convolved with the channel estimates for their respective sectors, where L represents the number of sectors from which the user device receives a signal. At 706, the output of the L convolutions can be aggregated (e.g., summed), and the sum can be subtracted from the received signal vector, r.

At 708, energies associated with Walsh bins for all sectors can be evaluated and ranked. User device code sequences (e.g., where a number of code sequences for a user device is equal to 128 divided by the spreading factor for the user device) can be convolved with the channel estimate for each sector, at 710. At 712, remaining code sequences (e.g., code sequences not intended for the user device in question) can be convolved with respective sector channel estimates. At 714, an MMSE estimate can be evaluated to determine a value for $\hat{d}_{MMSE}=(T^H T+\sigma^2 I)^{-1}T^H$. A complexity associated with such evaluation can be correlated to a number of columns in system matrix T (e.g., N columns). It is to be understood that acts 704-714 can be performed every 128 chips (e.g., every 33.35 microseconds, . . . ), if desired.

It will be appreciated that, in accordance with one or more embodiments and/or methods described herein, inferences can be made regarding selective interference cancellation, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding a number of dominant interferers to cancel in order to facilitate providing inter-sector interference equalization. To further this example, it can be determined that a number of channels, associated with user devices other than the user device at which a signal is received, are causing interference ant a level higher than a predetermined acceptable level. In such a scenario, inferences can be made that canceling channels associated with such user devices will bring the interference level back within an acceptable range. Based at least in part on such inferences, designated interfering channels can be cancelled according to one or more techniques described herein, and the user device can proceed to process and/or decode information intended there for while enjoying a reduced interference level. It will be appreciated that the foregoing example is illustrative in nature, and is not intended to limit the manner in which inferences can be made or the number of inferences that can be made in conjunction with they various systems and/or methods presented herein.

Figure 8:
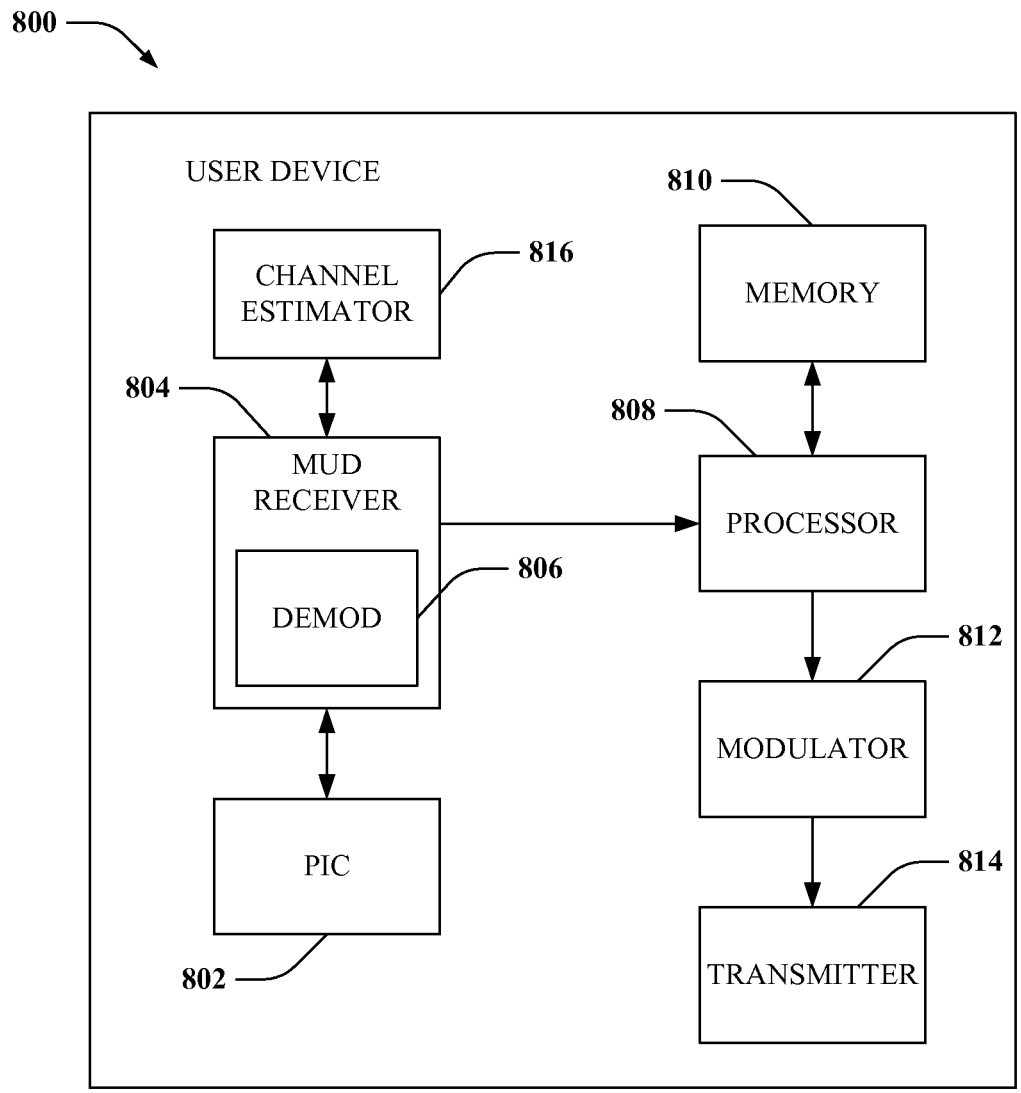
FIG. 8 is an illustration of a user device that facilitates performing pilot interference cancellation as well as selective interference cancellation techniques utilizing a generic MUD receiver in a UMTS TDD wireless communication environment, in accordance with one or more embodiments described herein.

FIG. 8 is an illustration of a user device 800 that facilitates performing pilot interference cancellation as well as selective interference cancellation techniques utilizing a generic MUD receiver in a UMTS TDD wireless communication environment, in accordance with one or more embodiments described herein. User device 800 comprises a pilot interference canceller 802 that can cancel pilot channels' contributions to a received signal as set forth with regard to FIG. 2. User device 800 further comprises a MUD receiver 804 that receives a signal from, for instance, a receive antenna, and performs typical actions (e.g., filters, amplifies, downconverts, etc.) on the received signal and digitizes the conditioned signal to obtain samples. MUD receiver 804 can facilitate detection of multiple users as will be appreciated by one skilled in the art. MUD receiver 804 can comprise a demodulator 806, which can facilitate output of demodulated data symbols, dMMSE (and/or dLs) as set forth with regard to preceding examples and/or figures, which in turn can be analyzed by a processor 808. MUD receiver 804 can additionally be operatively coupled to a channel estimator 816 that estimates channels for a number, L, of sectors from which user device 800 receives a signal, as set forth with regard to the preceding figures as well as the systems and methods set forth with regard thereto.

Processor 808 can be a processor dedicated to analyzing information received by MUD receiver 804 and/or generating information for transmission by a transmitter 814, a processor that controls one or more components of user device 800, and/or a processor that both analyzes information received by MUD receiver 804, generates information for transmission by transmitter 814 and controls one or more components of user device 800. User device 800 can additionally comprise memory 810 that is operatively coupled to processor 808 and that stores information related to pilot sequences, interference cancellation techniques, etc. Memory 810 can additionally store information associated with sector identities, pilots employed thereby, matrix reduction protocols, Hadamard transform techniques, etc., such that user device 800 can employ stored protocols, algorithms, and/or information to facilitate forward link interference equalization and system matrix reduction to mitigate computational overhead as described herein.

It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 810 of the subject systems and methods is intended to comprise, without being limited to, these and any other suitable types of memory.

User device 800 still further comprises a symbol modulator 812 that modulates a signal, and a transmitter 814 that transmits a modulated signal generated by processor 808 to a base station (not shown). In this manner, user device 800 can facilitate permitting pilot interference cancellation for employment in conjunction with a selective interference cancellation technique performed by a MUD receiver in a UMTS TDD communication environment to reduce computational overhead and minimize interference experienced by user device 800.

Figure 9:
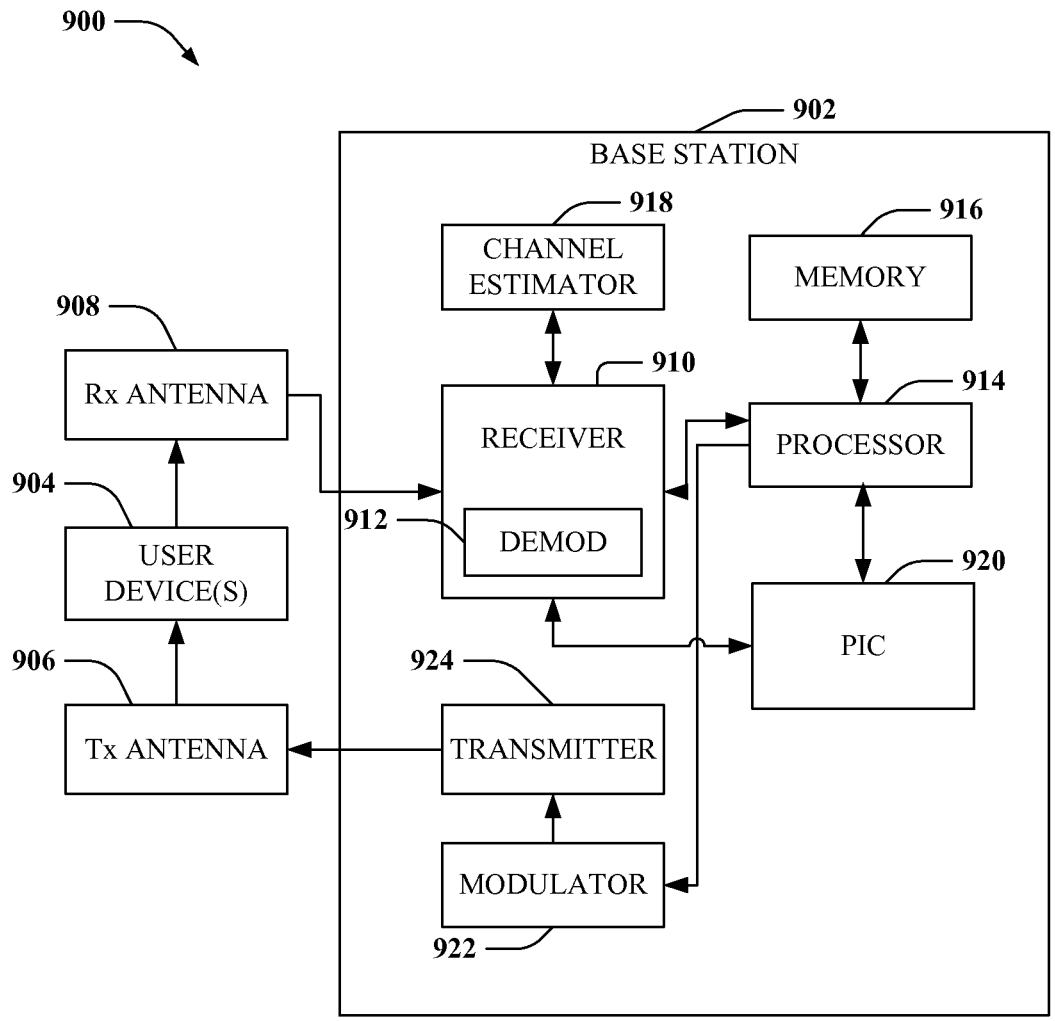
FIG. 9 is an illustration of a system that facilitates mitigating inter-sector interference in a UMTS TDD wireless communication environment, in accordance with one or more aspects set forth herein.

FIG. 9 is an illustration of a system 900 that facilitates mitigating inter-sector interference in a UMTS TDD wireless communication environment, in accordance with one or more aspects set forth herein. System 900 comprises a base station 902 that communicates with one or more user devices 904 via a transmit antenna 906 and a receive antenna 908, although more than one transmit and receive antenna can be employed in conjunction with various aspects. Base station 902 comprises a receiver 910, such as a MUD receiver, that receives information from receive antenna 908 and is operatively associated with a demodulator 912 that demodulates received information. Demodulated symbols can be analyzed by a processor 914 that is similar to the processor described above with regard to FIG. 8, which is coupled to a memory 916 that stores information related to user device 904, a pilot sequences employed thereby and/or utilized by base station 902, as well as other base stations transmitting to user device 904, interference cancellation protocols, and/or any other suitable information related to permitting base station 902 to facilitate interference cancellation as described herein.

Receiver 910 is further coupled to a channel estimator 918 that can provide estimations of one or more channels in a received transmission to facilitate signal processing, etc., to permit a modulator 922 and/or transmitter 924 in base station 902 to appropriately modulate and transmit a communication signal to user device 904 via transmit antenna 906. Additionally, receiver 910 is operatively coupled to a PIC component 920 similar to the PIC component described with regard to FIG. 2, which can facilitate pilot interference cancellation in the event that base station 902 is inundated with an unacceptable level of interference from transmitting user devices. Thus, although the majority of this document describes various aspects in conjunction with interference equalization on a forward link, the systems and methods set forth above can be employed at a base station to facilitate reducing processing overhead on the reverse link as well.

Figure 10:
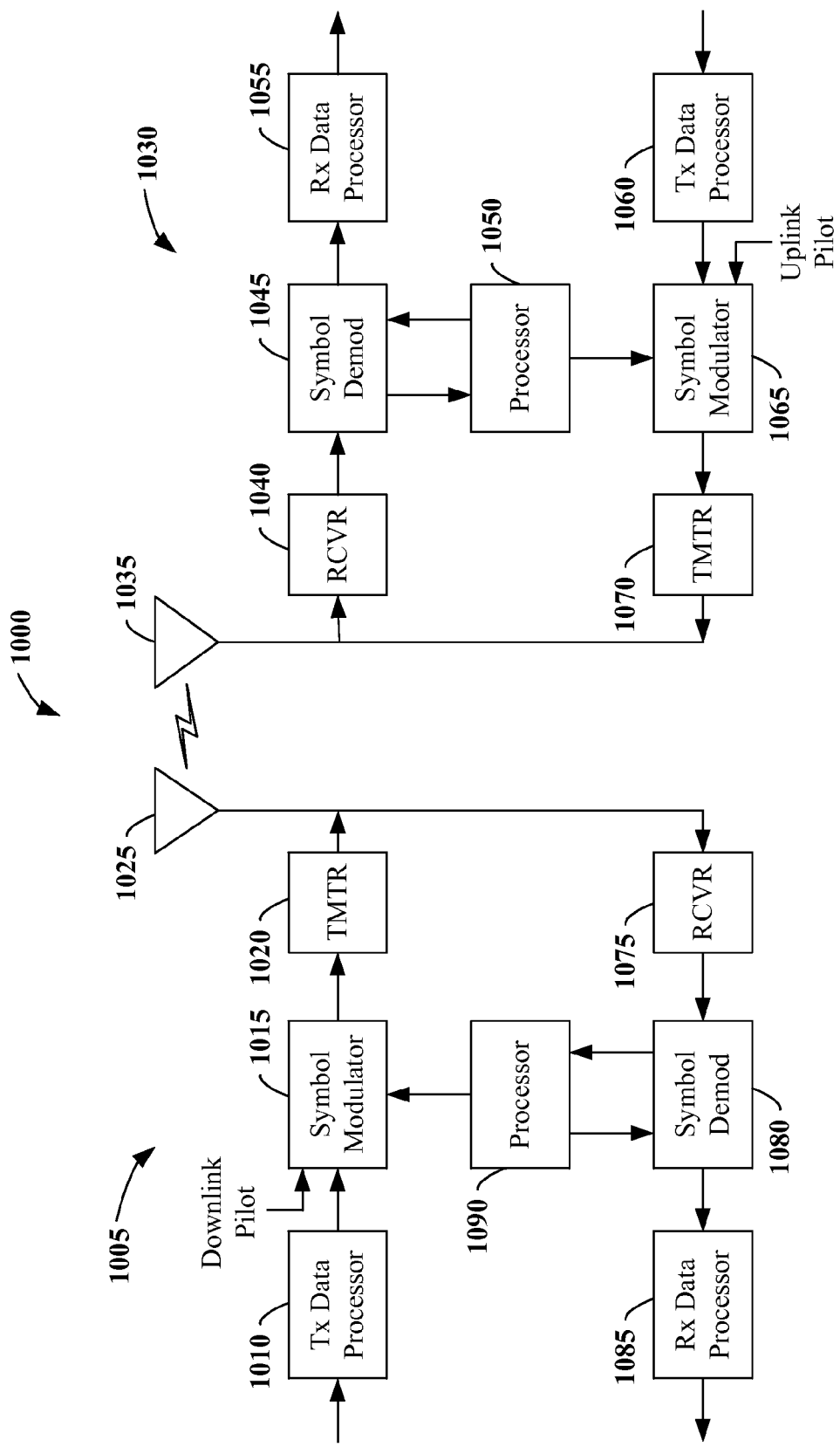
FIG. 10 is an illustration of a wireless network environment that can be employed in conjunction with the various systems and methods described herein.

It FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-4 and 8-9) and/or methods (FIGS. 5-7) described herein to facilitate wireless communication there between.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1020 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency downconverts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol demaps), deinterleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

On the uplink, a TX data processor 1060 processes traffic data and provides data symbols. A symbol modulator 1065 receives and multiplexes the data symbols with pilot symbols, performs modulation, and provides a stream of symbols. A transmitter unit 1070 then receives and processes the stream of symbols to generate an uplink signal, which is transmitted by the antenna 1035 to the access point 1005.

At access point 1005, the uplink signal from terminal 1030 is received by the antenna 1025 and processed by a receiver unit 1075 to obtain samples. A symbol demodulator 1080 then processes the samples and provides received pilot symbols and data symbol estimates for the uplink. An RX data processor 1085 processes the data symbol estimates to recover the traffic data transmitted by terminal 1030. A processor 1090 performs channel estimation for each active terminal transmitting on the uplink. Multiple terminals may transmit pilot concurrently on the uplink on their respective assigned sets of pilot subbands, where the pilot subband sets may be interlaced.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of mitigating inter-sector interference, the method comprising:
    performing a pilot interference cancellation technique on pilot sequences in a received signal; and
    performing a selective interference cancellation technique on the received signal after performing the pilot interference cancellation technique, wherein performing the selecting interference cancellation technique comprises:
        populating $N_d$ columns of an N-column system matrix, the $N_d$ columns corresponding to desired data for a first user device, wherein N and $N_d$ are integers and N is greater than $N_d$;
        evaluating energy in Walsh bins for each sector from which the received signal is received to select N-$N_d$ user devices other than the first user device having strongest channel energies;
        populating a remaining N-$N_d$ columns of the system matrix, the remaining N-$N_d$ columns corresponding to the selected N-$N_d$ user devices; and
        canceling a subset of code sequences in the received signal related to the remaining N-$N_d$ columns of the system matrix.

2. The method of claim 1, further comprising estimating a channel for each sector from which a signal is received.

3. The method of claim 2, further comprising, for each sector, convolving a 128-chip sequence code with the channel estimate for the sector.

4. The method of claim 3, further comprising adding the convolved values for the sectors and subtracting the sum from the received signal.

5. The method of claim 1, further comprising convolving code sequences for the first user device with respective channel estimates for the sectors.

6. The method of claim 5, further comprising convolving other code sequences received in the signal with channel estimates for respective sectors.

7. The method of claim 6, further comprising evaluating a minimum mean-squared error output estimate.

8. The method of claim 1, wherein performing the pilot interference cancellation technique comprises subtracting known pilot sequence energies from the received signal.

9. The method of claim 1, further comprising performing a fast Hadamard transform to reduce the system matrix from a N×128 matrix to a N×N reduced system matrix to reduce processing overhead.

10. The method of claim 9, further comprising processing the reduced system matrix and decoding code sequences intended for the user device.

11. An apparatus that facilitates reducing inter-sector interference in a wireless communication environment, the apparatus comprising:
a memory;
a processor coupled to the memory, and configured to:
perform a pilot interference cancellation technique on pilot sequences in a received signal; and
perform a selective interference cancellation technique on the received signal after performing the pilot interference cancellation technique by:
populating $N_d$ columns of an N-column system matrix, the $N_d$ columns corresponding to desired data for the apparatus, wherein N and $N_d$ are integers and N is greater than $N_d$;
evaluating energy in Walsh bins for each sector from which the received signal is received to select $N-N_d$ user devices other than the apparatus having strongest channel energies;
populating a remaining $N-N_d$ columns of the system matrix, the remaining $N-N_d$ columns corresponding to the selected $N-N_d$ user devices; and
canceling a subset of code sequences in the received signal related to the remaining $N-N_d$ columns of the system matrix.

12. The apparatus of claim 11, wherein the processor is further configured to estimate a channel for each of a plurality of sectors from which the apparatus receives a signal.

13. The apparatus of claim 12, wherein the processor is further configured to evaluate pilot sequences stored in the memory and to subtract energies associated therewith from the receive signal energy to cancel pilot sequences from the system matrix.

14. The apparatus of claim 13, wherein:
the apparatus further comprises a multi-user detection (MUD) receiver, coupled to the processor, configured to receive a signal from at least one sector transmitter; and
the processor is further configured to cancel signal energies associated with the $N-N_d$ user devices other than the apparatus having strongest channel energies.

15. The apparatus of claim 11, wherein the processor is further configured to perform a fast Hadamard transform to reduce the system matrix from a N×128 matrix to a N×N reduced system matrix.

16. The apparatus of claim 15, wherein the processor is further configured to process the reduced system matrix to decode information intended for the apparatus.

17. The apparatus of claim 11, wherein the apparatus is at least one of a cellular phone, a smartphone, a personal digital assistant (PDA), a laptop computer, a handheld communication device, a handheld computing device, a satellite radio, or a global positioning system device.

18. An apparatus that facilitates mitigating interference in a wireless communication environment, the apparatus comprising:
means for performing a pilot interference cancellation technique on pilot sequences in a received signal; and
means for performing a selective interference cancellation technique on the received signal after performing the pilot interference cancellation technique, wherein the means for performing the selecting interference cancellation technique comprises:
means for populating $N_d$ columns of an N-column system matrix, the $N_d$ columns corresponding to desired data for the apparatus, wherein N and $N_d$ are integers and N is greater than $N_d$;
means for evaluating energy in Walsh bins for each sector from which the received signal is received to select $N-N_d$ user devices other than the apparatus having strongest channel energies;
means for populating a remaining $N-N_d$ columns of the system matrix, the remaining $N-N_d$ columns corresponding to the selected $N-N_d$ user devices; and
means for canceling a subset of code sequences in the received signal related to the remaining $N-N_d$ columns of the system matrix.

19. The apparatus of claim 18, wherein the means for generating the system matrix comprises means for generating the system matrix based on code sequences in the received signal.

20. The apparatus of claim 19, further comprising means for reducing the system matrix by subtracting out energies associated with cancelled pilot sequences and selectively cancelled code sequences.

21. The apparatus of claim 20, further comprising means for performing a fast Hadamard transform to reduce the system matrix.

22. The apparatus of claim 21, further comprising means for processing the reduced system matrix to decode code sequences for the apparatus.

23. A non-transitory computer-readable medium having stored thereon computer-executable instructions for:
performing a pilot interference cancellation technique on pilot sequences in a received signal; and
performing a selective interference cancellation technique on the received signal after performing the pilot interference cancellation technique, wherein performing the selecting interference cancellation technique comprises:
populating $N_d$ a columns of an N-column system matrix, the $N_d$ columns corresponding to desired data for a first user device, wherein N and $N_d$ are integers and N is greater than $N_d$;
evaluating energy in Walsh bins for each sector from which the received signal is received to select $N-N_d$ user devices other than the first user device having strongest channel energies;
populating a remaining $N-N_d$ columns of the system matrix, the remaining $N-N_d$ columns corresponding to the selected $N-N_d$ user devices; and
canceling a subset of code sequences in the received signal related to the remaining $N-N_d$ columns of the system matrix.

24. The computer-readable medium of claim 23, further comprising instructions for performing a fast Hadamard transform on the system matrix to generate a reduced system matrix.

25. The computer-readable medium of claim 24, further comprising instructions for processing the reduced system matrix to evaluate a portion of the received signal intended for the first user device.

26. At least one processor configured to reduce interference in a wireless communication environment, the at least one processor comprising:
a first module for performing a pilot interference cancellation technique on pilot sequences in a received signal; and
a second module for performing a selective interference cancellation technique on the received signal after performing the pilot interference cancellation technique, wherein performing the selecting interference cancellation technique comprises:
populating $N_d$ columns of an N-column system matrix, the $N_d$ columns corresponding to desired data for a first user device, wherein N and $N_d$ are integers and N is greater than $N_d$;
evaluating energy in Walsh bins for each sector from which the received signal is received to select $N-N_d$ user devices other than the first user device having strongest channel energies;
populating a remaining $N-N_d$ columns of the system matrix, the remaining $N-N_d$ columns corresponding to the selected $N-N_d$ user devices; and
canceling a subset of code sequences in the received signal related to the remaining $N-N_d$ columns of the system matrix.

27. The at least one processor of claim 26, further comprising a third module for performing a fast Hadamard transform on the system matrix to generate a reduced system matrix.

28. The at least one processor of claim 27, further comprising a fourth module for processing the reduced system matrix to evaluate code sequences in the received signal intended for the first user device.

29. The apparatus of claim 18, wherein the received signal comprises at least two pilots from at least two sectors.

30. The apparatus of claim 29, further comprising means for performing multi-user detection subsequent to the pilot interference cancellation technique performed on the received signal.

31. The computer-readable medium of claim 23, wherein the instructions for performing the pilot interference cancellation technique comprise instructions for performing the pilot interference cancellation technique based at least in part on known pilot sequences associated with at least two sectors from which the received signal is transmitted.

32. The computer-readable medium of claim 23, further comprising instructions for performing multi-user detection after the pilot interference cancellation technique to cancel out code sequences from the received signal.

33. The at least one processor of claim 26, wherein the first module is configured to perform the pilot interference cancellation technique based at least in part on known pilot sequences associated with at least two sectors from which the received signal is transmitted.

34. The at least one processor of claim 26, further comprising a third module for performing multi-user detection after the pilot interference cancellation technique to cancel out code sequences from the received signal.

* * * * *